United States Patent [19]

Kida

[11] Patent Number: 4,941,142

[45] Date of Patent: Jul. 10, 1990

[54] FRAME ERASING METHOD FOR TOKEN RING NETWORKS WITHOUT LAST FRAME INDICATION WITHIN THE FRAME FORMAT

[75] Inventor: Yasushi Kida, Osaka, Japan

[73] Assignee: Sumitomo Electric Industries, Ltd., Osaka, Japan

[21] Appl. No.: 304,243

[22] Filed: Jan. 31, 1989

[30] Foreign Application Priority Data

Feb. 8, 1988 [JP] Japan .................................. 63-27254

[51] Int. Cl.$^5$ .............................................. H04J 3/14
[52] U.S. Cl. .................................. 370/85.5; 370/85.4
[58] Field of Search ..................... 370/86, 88, 89, 85.5, 370/85.4, 85.12, 85.15, 85.13; 340/825.05

[56] References Cited

U.S. PATENT DOCUMENTS

| | | | |
|---|---|---|---|
| 4,507,777 | 3/1985 | Tucker et al. | 370/86 |
| 4,539,679 | 9/1985 | Bux et al. | 370/86 |
| 4,566,097 | 1/1986 | Bederman | 370/89 |
| 4,674,086 | 6/1987 | Szczepanek et al. | 370/86 |
| 4,792,947 | 12/1988 | Takiyasu et al. | 370/86 |

Primary Examiner—Douglas W. Olms
Assistant Examiner—Min Jung
Attorney, Agent, or Firm—Lane, Aitken & McCann

[57] ABSTRACT

In a token ring transmission method wherein a plurality of nodes are interconnected in a ring form by a transmission path through which information are sent as frames in one direction, a right-to-send in said transmission path is obtained by a sender node of said nodes that holds a token to be sent to said transmission path, and the format of said frames does not have any field to indicate the last frame sent in each capture of said token, the improvement comprises the steps of: additionally sending an identification frame specific to said sender node from said sender node to the downstream node after information frames were sent from said sender node to said downstream node; sending said token from said sender node to said downstream node after said identification frame specific to said sender node was sent; at said sender node, erasing said frames that have traveled round said transmission path and returned to said sender node, irrespective of source addresses of said frames and without relaying said frames to sid downstream node; and when said sender node detected said specific identification frame, stopping said erasing step.

3 Claims, 6 Drawing Sheets

STATE TRANSITION OF NODE
ACCORDING TO PRESENT INVENTION

FIG. 2(a) REPEAT
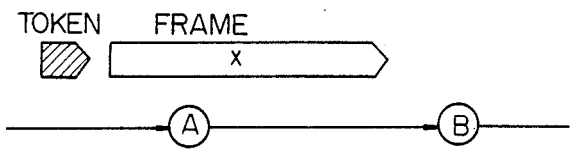
FIG. 2(b) ACQUISITION OF TOKEN
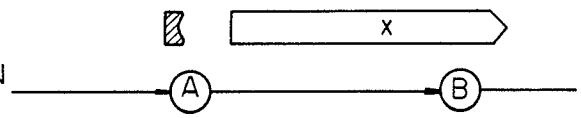
FIG. 2(c) TRANSMISSION OF FRAME
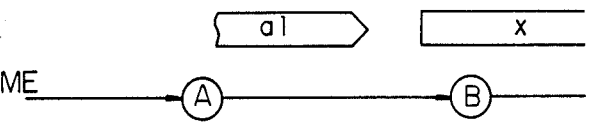
FIG. 2(d) ERASION DURING SENDING
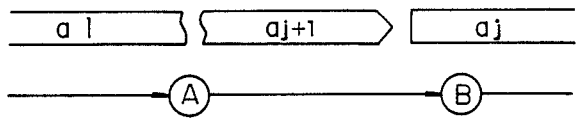
FIG. 2(e) TRANSMISSION OF MARKER AND TOKEN
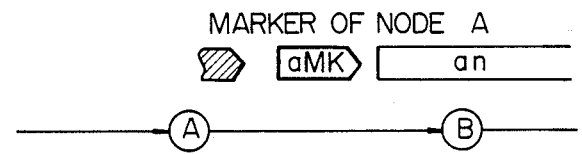

TOKEN ACQUISITION BY NODE B

FRAME TRANSMISSION BY NODE B

ERASION

ERASION OF MARKER

REPEAT

SIGNAL CHANGE AND OPERATION TRANSITION OF RECEIVING END OF NODE A

LAN (local area network) OF
TOKEN PASSING RING TYPE

PRIOR-ART

STATE TRANSITION OF PRIOR ART NODE

PRIOR-ART

FRAME ERASING METHOD FOR TOKEN RING NETWORKS WITHOUT LAST FRAME INDICATION WITHIN THE FRAME FORMAT

FIELD OF THE INVENTION

The present invention relates to a token ring transmission method employed in a LAN (local area network).

DESCRIPTION OF THE PRIOR ART

As conventional transmission methods employed in a LAN (local area network) of the token passing ring type, there are known IBM method, IEEE 802.5 method and FDDI method.

As shown in FIG. 4, the token passing ring type LAN is a system wherein a plurality of nodes A, B, . . . are interconnected in a ring form by a transmission path 1 through which information (in the form of frame) is transmitted in one direction (here, anticlockwise direction) shown by the arrow in FIG. 4. Each node of such system executes the transition of operation, as shown in FIG. 5. In FIG. 5, each node is normally in a repeating state, and receives a frame in which information sent from the upstream node is included and which is constructed in a predetermined format, and relays the frame and sends it to the downstream node. In addition to the relaying operation, each node in the repeating state also acquires and copies a frame, when the destination address of the frame is identical with the node. If the node in the repeating state has a request-to-send and starts receiving an enabled token, the node transits from the repeating state to a token acquiring state wherein a token to be sent from the upstream node is acquired. After the node completes the acquisition of the token, the node transits to a frame ready-to-send state wherein a right-to-send in the transmission path 1 is obtained, and if sending a necessary frame, transits to a token sending state. The node in the token sending state sends the token to the downstream node if requirements to be described hereinafter are met, and then returns back to the repeating state. In the repeating state, if the node detects that the address thereof is identical with a source (sender) address in the frame, the node transits to an one-frame erasing state. In this one-frame erasing state, the node erases the frame originated therefrom without sending it to the downstream node, and then returns back to the repeating state.

In this case, the node that has sent one frame erases the frame originated therefrom, at the time it has travelled round the ring-shaped transmission path 1 and has returned. Therefore, in each of the IBM method, IEEE 802.5 and FDDI method the node that has sent one frame is required to identify the frame originated therefrom, and this identifying method is carried out as follows.

(1) IBM method

A source (sender) address is incorporated in a part of a frame in which information to be sent is incorporated, and this source address is memorized in a sender node that is to send the frame. After one frame is sent, the transmission of a token and a frame is stopped until the frame having the memorized source address is received by the sender node. As a result, since in a ring-shaped transmission path only one frame is sent, it is assured that the node that has received the frame is a sender node that has sent the frame, and thus a frame sent from a sender node can be eraised reliably by the sender node concerned.

(2) IEEE 802.5 method

This method is substantially the same as the IBM method but different in the following. The number of frames to be sent is more than two. A sender node does not send a token until the sender node receives a frame having a source address identical with the address of the sender node. Further, a code indicating an "end of frame" is applied to a frame to be sent last, and the frames that have been received by the time the code is detected are erased as frames sent from the node concerned.

(3) FDDI method

A frame having a source address identical with the address of a node that has sent a frame is erased as the frame sent from the node concerned.

However, the prior art methods described above have the following drawbacks.

Any method erases a frame that has travelled round a ring-shaped transmission path and returned, by detecting the source address of the frame, and therefore a frame including a source address identical with an address of a sender node of another network cannot be sent. That is, in the case that a plurality of networks are interconnected and that it is required to pass information from one network to another network, the frame including a source address identical with an address of a sender node of another network cannot be erased and thus information cannot be passed from one network to another network, as in the method described above the node of one network cannot identify a frame having a source address identical with an address of a sender node of another network as a frame that the node of one network has sent. Although a frame can be sent and relayed by rewriting the source address, there is needed an additional means for identifying a sender node of other networks, and as a result the information processing becomes complicated.

On the other hand, since in the IBM method another frame is not sent until the first frame has returned, the above mentioned problem can be overcome by modifying, each time one frame is sent, the source address of a frame memorized in a sender node to be identical with the address of a relay frame through which the frame is relayed. However, since in this IBM method the next frame is not sent until the frame sent has returned, a plurality of pieces of frames cannot be sent with high efficiency, and the efficiency of transmission is reduced as the time that a frame is required to travel round a ring-shaped transmission path is increased.

Accordingly, it is an object of the present invention to provide an improved token ring transmission method wherein in the case information is relayed in a system of interconnected networks, the information processing is simple and the relay is carried out reliably and wherein there is no reduction in the efficiency of transmission.

SUMMARY OF THE INVENTION

In a token ring transmission method wherein a plurality of nodes are interconnected in a ring form by a transmission path through which information are sent as frames in one direction, and a right-to-send in the transmission path is obtained by a sender node of the nodes that holds a token to be sent to the transmission path, and the format of the frames does not have any field to indicate the last frame sent in each capture of the token, the improvement comprises the steps of: additionally sending an identification frame specific to the sender node from the sender node to the downstream node after information frames sent from the sender node to the downstream node; sending the token from the sender node to the downstream node after the identification frames specific to the sender node was sent; at said sender node erasing the frames that have travelled round the transmission path and returned to the sender node, irrespective of source addresses of said frames and without relaying the frames to the downstream node; and when the sender node detected the specific identification frame, stopping the erasing step.

The token ring transmission method may further comprise the steps of: detecting a transmission abnormality by the sender node; if the sender node detects the transmission abnormality, sending information indicating the abnormality; and if the sender node detects a token or the information indicating the abnormality, stopping the erasing step.

BRIEF DESCRIPTION OF THE DRAWINGS

The drawbacks of a conventional token ring transmission method and the features and advantages of a token ring transmission method according to the present invention will be more clearly understood from the following description taken in conjunction with the accompanying drawings:

FIGS. 2(a) through 2(j) schematically illustrate the operating state of the node in accordance with the token ring transmission method according to the present invention, respectively;

DESCRIPTION OF THE PREFERRED EMBODIMENTS

Figure 1:
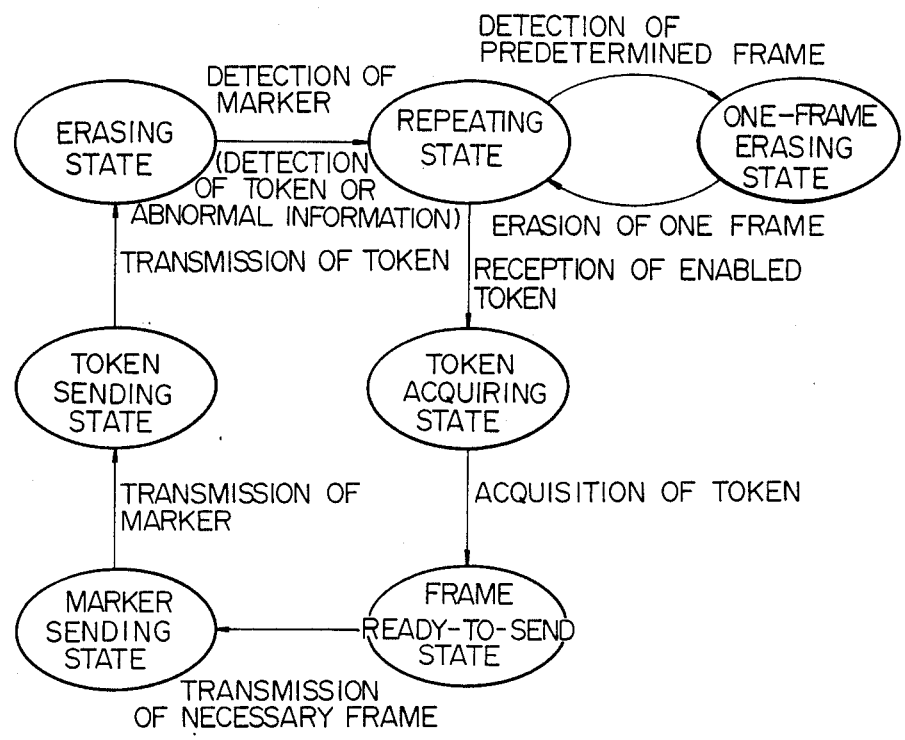
FIG. 1 is a flow chart showing the state transition of a node in accordance with a token ring transmission method according to an embodiment of the present invention.
Figure 2F:
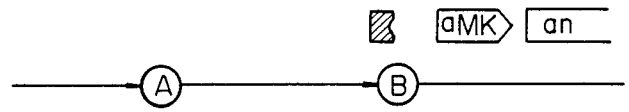
Figure 2G:
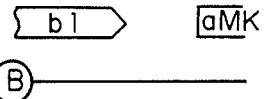
Figure 2H:
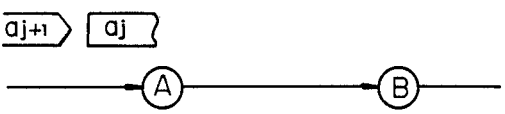
Figure 2I:
Figure 2J:
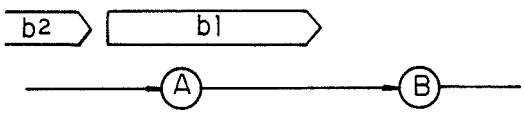
Figure 3:
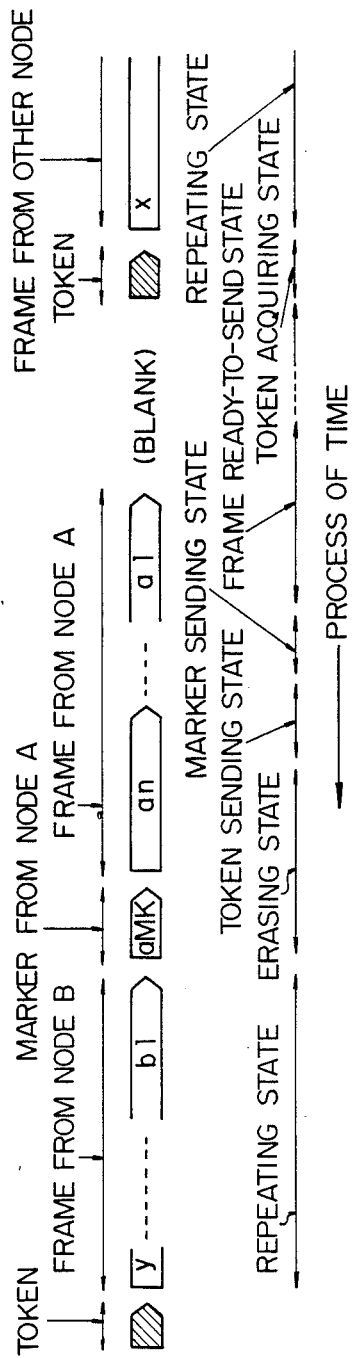
FIG. 3 schematically illustrates the signal change and state transition of the receiving end of the node in accordance with the token ring transmission method according to the present invention.
Figure 4:
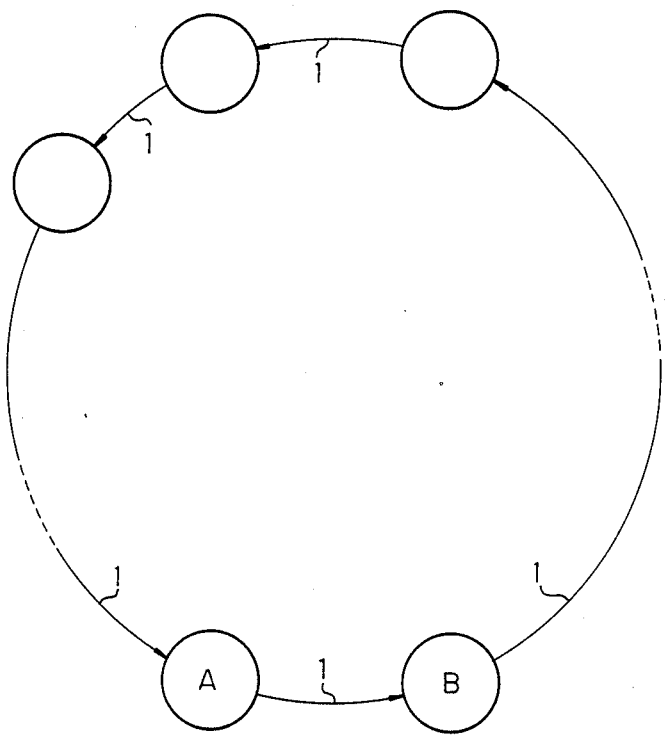
FIG. 4 is a schematic view showing a LAN (local area network) of the token passing ring type.
Figure 5:
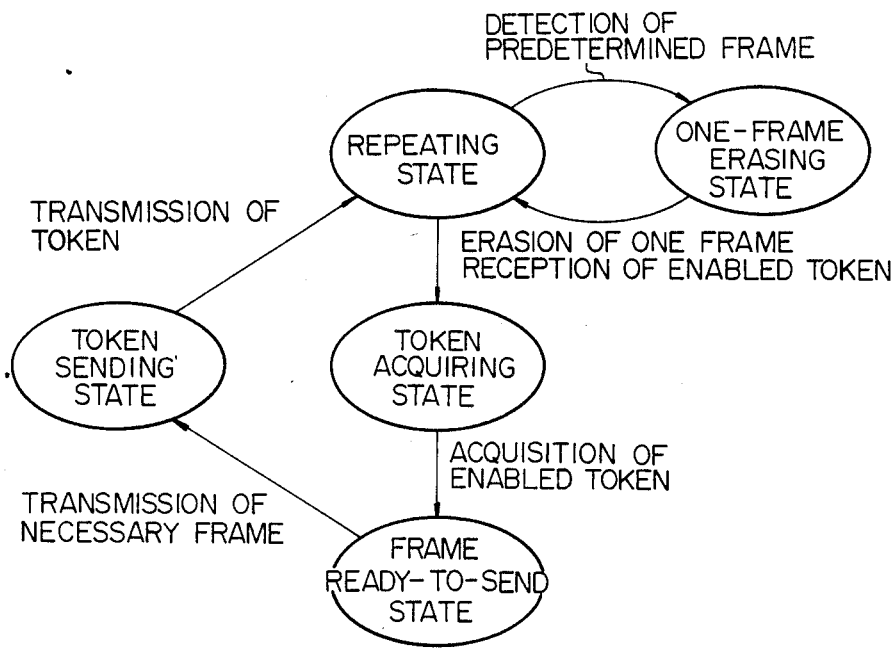
FIG. 5 is a schematic view showing the state transition of the node according to the conventional token ring transmission method.

Referring FIGS. 1 through 3, there is shown a preferred embodiment of a token ring transmission method in accordance with the present invention. The token ring transmission method according to the embodiment of the present invention is applied to the LAN (local area network) of the token passing ring type as shown in FIG. 4. When the node of this embodiment holds a token and is in a frame ready-to-send state, the node sends a predetermined number of frames each including a source (sender) address and information, within an allowed sending time, as shown in FIG. 1.

In FIG. 1, after necessary frames were sent, the node in the frame ready-to send state transits to a specific identification information sending state (in this embodiment, the identification information specific to a sender node comprises a marker), and sends a marker therefrom. The marker has the same frame configuration as a frame of other information and is discriminated from the frame of other information by a frame identifier (frame control signal), and the destination address of the marker is constituted by information indicating that there is no appropriate node, and the sender address of the marker corresponds to an address of a node that sends a marker.

The node that has sent the marker transits to a token sending state, and if the sending of a token is completed, transits to an erasing state. The node in the erasing state removes all the frames that have been received by the time the marker is detected, without relaying the frames to the downstream node. If the marker is detected, the node in the erasing state transits to a repeating state, and relays a frame, and copies out a frame when necessary. Also, if the node in the repeating state receives a frame having a source address identical with the address of the node that has sent the frame, the node transits to an one-frame erasing state. In the one-frame erasing state, the node removes one frame that has been sent therefrom without relaying it to the downstream node, and again returns to the repeating state. Furthermore, if the node in the repeating state receives a token that is enabled, the node transits to a token acquiring state. It should here be noted that the requirements that a token is enabled are (1) that a request-to-send occurs in the node that have received a token and (2) that the circular timer value condition of the token is met (FDDI method).

If the token is completely acquired and held, the node transits from the token acquiring state to a frame ready-to-send state. The node in the erasing state is also detecting a transmission abnormality, and if the node detects abnormality, it sends information indicating abnormality. On the other hand, the node that has held the above mentioned token also transits to from the erasing state to the repeating state in the case a token or information indicating the aforesaid abnormality is detected. These transitions are carried out by a node control part (which is not shown but comprises a MAC sublayer including a logic circuit and the like).

The operation of the system will hereinafter be described in detail, making reference to the node A in the LAN as shown in FIG. 4 comprising a plurality of nodes A, B, . . . each executing the transition of the operating state described above and shown in FIG. 1.

As previously described, the node A is normally in the repeating state, and if a frame x sent by other node is sent from the upstream node to the node A, the node A relays the frame x and sends it to the downstream node B (FIG. 2(a)). If the destination address of this frame is identical with the address of the node A, the node A copies out the frame and holds it.

In the case a request-to-send occurred in the node A, the node A awaits an enabled token and acquires it (FIG. 2(b)). The node A then sends successively a plurality of frames a1, a2, . . . and an, each including a predetermined information (FIG. 2(c)). The frames a1, a2, . . . and an are relayed through the node B and other nodes in the repeating state, and travel round the ring-shaped transmission path and return again to the node A. At this time, in the case the sending time allowed to each node is longer than the time a frame travels round the ring-shaped transmission path 1, the frames a1, a2 and the like that were sent at the beginning of the transmission have returned while the node A is in the frame sending state, but the frames a1, a2 and the like that have returned are removed from the transmission path, because the node A continues to send frames each including a predetermined information without relaying the frames a1, a2 and the like (FIG. 2(d)). After the node A has completed the sending of frames, it sends a marker aMK specific to the node A and successively sends the token (FIG. 2(e)). Thereafter, the node A transits to the erasing state and erases all the frames that have been received (FIG. 2(h)).

If on the other hand a request-to-send occurs in other node, the node acquires the token sent from the node A to obtain a right-to-send and then starts sending frames. For the simplicity, it is assumed that a request-to-send occurs in the node B. The token sent from the node A is acquired by the node B (FIG. 2(f)), and the node B sends in succession frames b1, etc (FIG. 2(g)). Since the token from the node A is sent after the frames a1, a2, . . . an and the marker aMK of the node A were sent therefrom, the frames a1, a2, . . . an and the marker aMK of the node A are relayed by the node B, and is followed by the frames from the node B. Likewise, even if a request-to-send occurs in other node and frames are sent, it is assured that the marker (not shown) of the node B sent from the node B is followed by the frames sent from other node.

Accordingly, as shown in FIG. 3, while the node A transits to from the repeating state to the token acquiring state, the frame ready-to-send state, the marker sending state, the token sending state and to the erasing state, the receiving end of the node A receives first the frame x sent from other node and a token, and then the frames a1, . . . and an of the node A, and finally the marker aMK of the node A.

The node A that was in the erasing state detects that the marker aMK of the node A has returned and erases this marker (FIG. 2(i)), and returns to the repeating state (FIG. 2(j)). Thereafter, the frames b1 and the like sent from the node B are received as shown in FIG. 3.

In this way, since in the embodiment the marker specific to the node A is inserted between the frames sent from the the node A and the frames sent from other node B, the frames sent from the node A is reliably identified and erased by the node A, even if the node A sends a frame having a source address different from the address of the node A. Accordingly, the token ring transmission of the present invention is particularly suited in the case of a plurality of interconnected networks.

Since each node can sent a token immediately after the marker specific to each node was sent, it is not necessary to await until the sending condition of the token is met. In addition, since the node can send the next frame before the frame sent from the node has returned, the efficiency of transmission can be increased. Particularly, in the case a transmission path is long or the speed of transmission is rapid, the efficiency of transmission is greatly increased because a plurality of frames can be sent successively and also it is not needed to await until the sending condition of the token is met. In addition, the system can be operated stably because the node is reset to the repeating state by the detection of a token or information indicating abnormality in addition to the detection of the marker specific to the node.

While certain representative embodiments and details have been shown for the purpose of illustrating the invention, it will be apparent to those skilled in this art that various changes and modifications may be made therein without departing from the scope of the invention.

For example, the identification information is not needed to be a frame if it is specific to a node. Also, the requirement that a token is enabled in each node may be either IEEE 802.5 method or FDDI method.

From the foregoing description, it will be seen that there is provided in accordance with the present invention an improved token ring transmission method wherein in the case information is relayed in a system of interconnected networks, the information processing is simple and the relay is carried out reliably and wherein there is no reduction in the efficiency of transmission.

I claim:

1. In a token ring transmission method wherein a plurality of nodes are interconnected in a ring form by a transmission path through which information are sent as information frames in one direction, a right-to-send in said transmission path is obtained by a sender node of said nodes, which sender node holds a token to be sent to said transmission path, and the format of said frames does not have any field to indicate the last frame sent in each capture of said token, the improvement comprising the steps of:

additionally sending an identification frame specific to said sender node from said sender node to the downstream node after information frames were sent from said sender node to said downstream node;

sending said token from said sender node to said downstream node after said identification frame specific to said sender node was sent;

at said sender node, erasing said frames that have traveled round said transmission path and returned to said sender node, irrespective of source address of said frames and without relaying said frames to said downstream node; and when said sender node detected said specific identification frame, stopping said erasing step.

2. A token ring transmission method as set forth in claim 1, further comprising the steps of:

detecting a transmission abnormality by said sender node;

if said sender node detects said transmission abnormality, sending information indicating said abnormality; and if said sender node detects a token or said information indicating said abnormality, stopping said erasing step.

3. A token ring transmission method as set forth in claim 1, wherein said source addresses of said information frames are different from the addresses of said sender node.

* * * * *